No. 730,301. PATENTED JUNE 9, 1903.
C. H. SAWYER.
WHEELED SCRAPER.
APPLICATION FILED SEPT. 2, 1902.
NO MODEL. 5 SHEETS—SHEET 1.

Witnesses

Inventor
Charles H. Sawyer
By Paul & Paul
his attorneys

No. 730,301. PATENTED JUNE 9, 1903.
C. H. SAWYER.
WHEELED SCRAPER.
APPLICATION FILED SEPT. 2, 1902.
NO MODEL. 5 SHEETS—SHEET 3.

Witnesses
E. G. Staude
O. G. Hanson

Inventor
Charles H. Sawyer
By Paul & Paul
his attorneys

No. 730,301. PATENTED JUNE 9, 1903.
C. H. SAWYER.
WHEELED SCRAPER.
APPLICATION FILED SEPT. 2, 1902.

NO MODEL. 5 SHEETS—SHEET 5.

Witnesses
E. G. Staude
O. G. Hanson

Inventor
Charles H. Sawyer
By Paul & Paul
his attorneys

No. 730,301. Patented June 9, 1903.

UNITED STATES PATENT OFFICE.

CHARLES H. SAWYER, OF MINNEAPOLIS, MINNESOTA, ASSIGNOR OF ONE-HALF TO H. A. SMITH, OF MINNEAPOLIS, MINNESOTA.

WHEELED SCRAPER.

SPECIFICATION forming part of Letters Patent No. 730,301, dated June 9, 1903.

Application filed September 2, 1902. Serial No. 121,783. (No model.)

*To all whom it may concern:*

Be it known that I, CHARLES H. SAWYER, of Minneapolis, county of Hennepin, State of Minnesota, have invented certain new and useful Improvements in Wheeled Scrapers, of which the following is a specification.

This invention relates to improvements in the construction of wheeled scrapers; and it consists generally in the combinations hereinafter described, and particularly pointed out in the claims.

Figure 1:
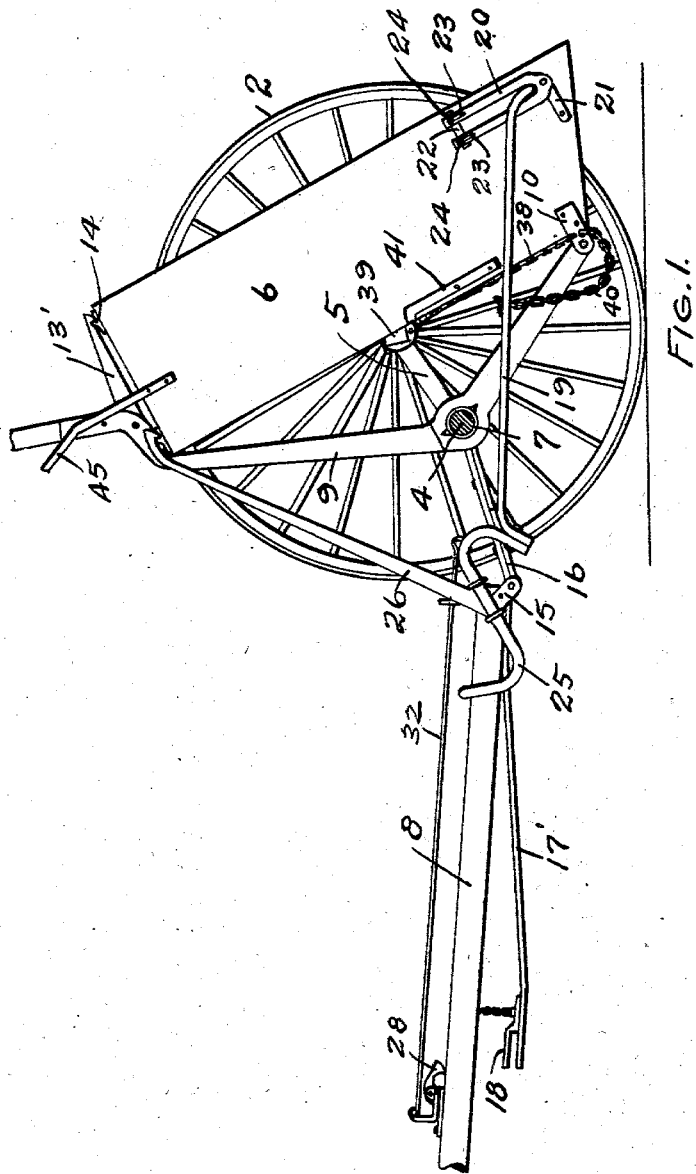
Figure 2:
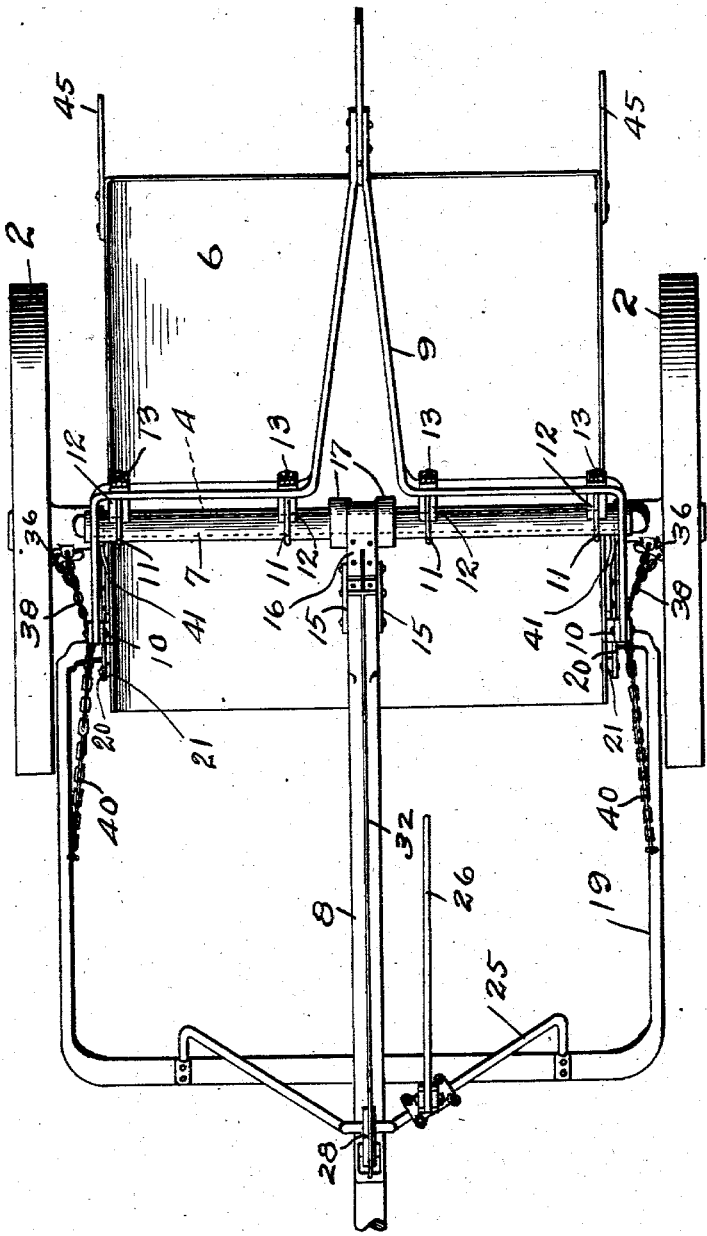
Figure 3:
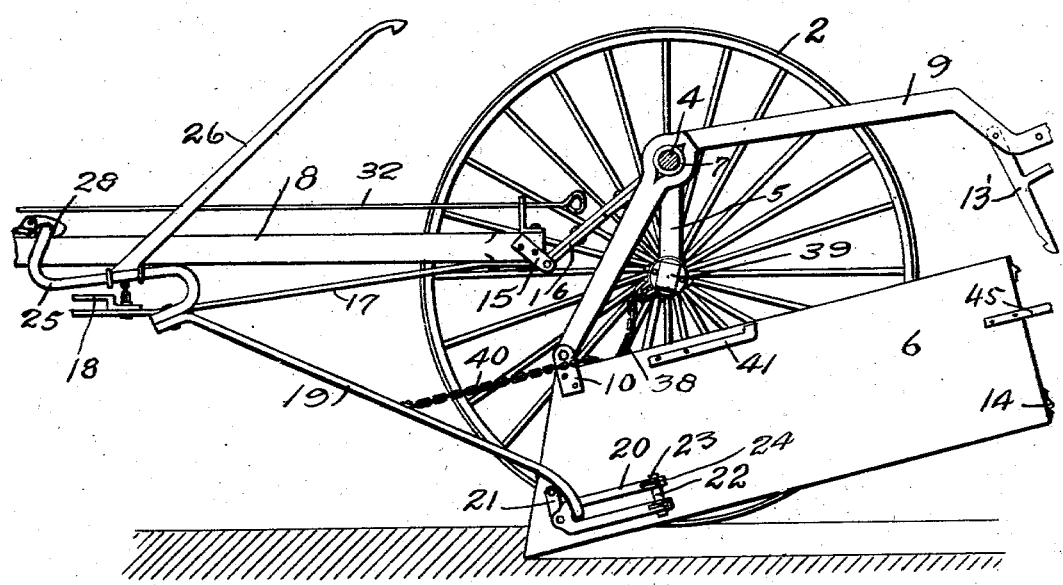
Figure 4:
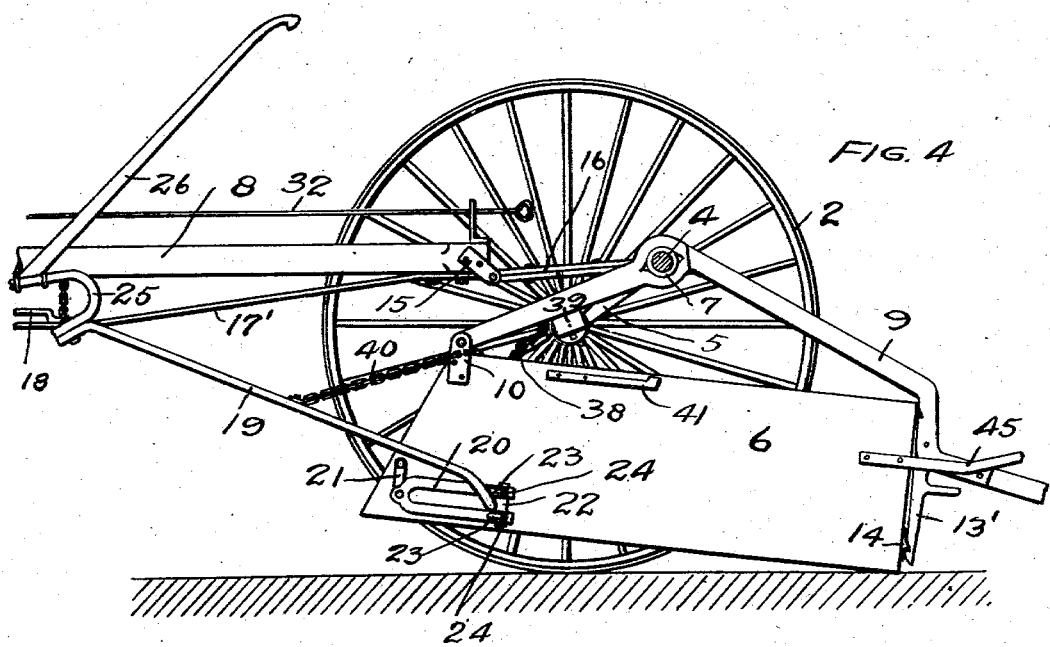
Figure 5:
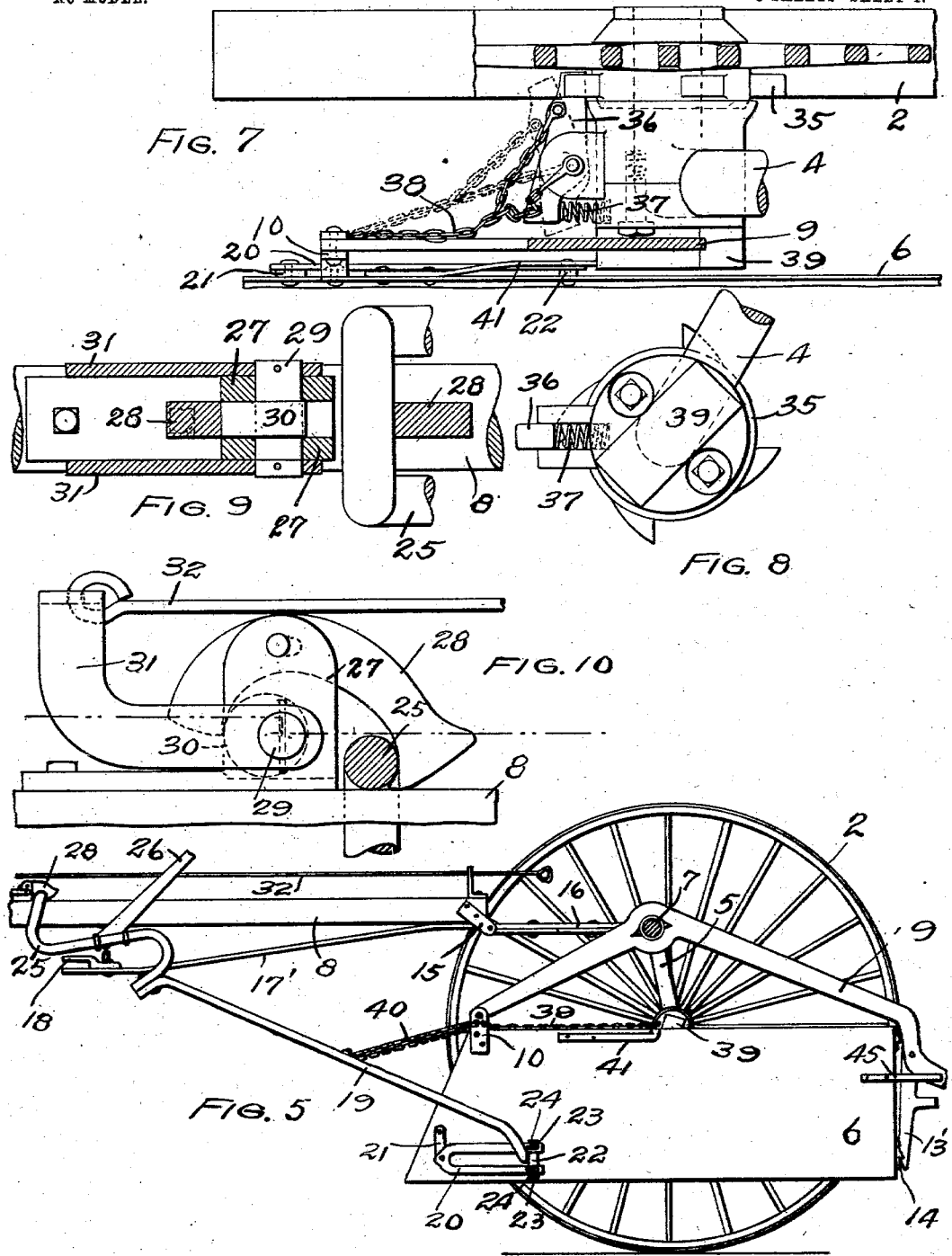
Figure 6:
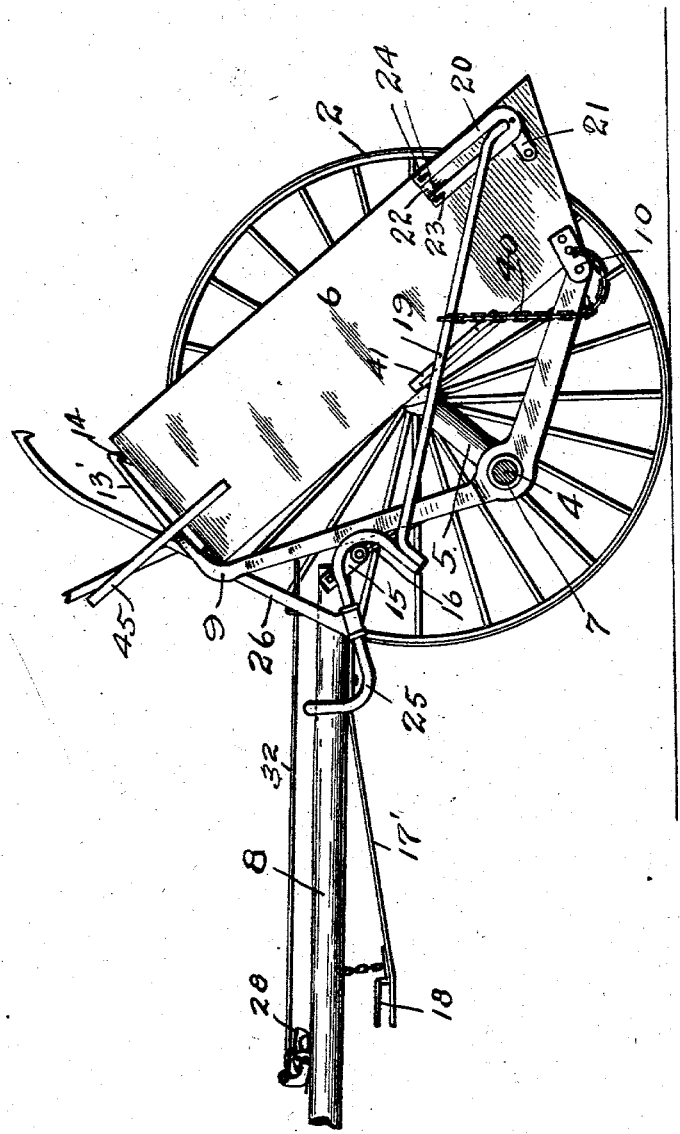

In the accompanying drawings, forming part of this specification, Figure 1 is a side elevation of a wheeled scraper embodying my invention with one of the wheels removed. Fig. 2 is a plan view. Fig. 3 is a view similar to Fig. 1 with the pan lowered into position for filling with earth. Fig. 4 is a similar view showing the pan with its forward end raised and the hind end connected to the operating-lever. Fig. 5 is a similar view showing the pan elevated for transportation purposes. Fig. 6 is a view similar to Fig. 1, showing the pan in a higher position, which it assumes in passing over obstructions. Figs. 7 and 8 are details of the clutch mechanism, and Figs. 9 and 10 are details of the hook that is employed for locking the bail.

In the drawings, 2 represents the wheels of the scraper, mounted upon the axle 4, which supports the pan or shovel 6 through means hereinafter described and to which is secured the draft pole or tongue 8. The axle 4 is provided with a crank or offset 5, arranged as near to the inner hub of each wheel as it may be conveniently located. The offset portion of the axle is provided with a sleeve 7, (see Fig. 2,) which surrounds the axle and is adapted to turn freely thereon. A forked operating-lever 9 is mounted upon the sleeve 7 near its ends and extends to the forward end of the pan, to which it is connected by means of the hangers 10. These hangers are preferably arranged upon the outside of the pan, and each one is pivotally connected at its upper end to one fork of the lever 9. The lever 9 at the rear of the axle preferably extends parallel with the sleeve 7 and is secured thereto by means of the clips 11. Blocks 12 are preferably arranged between the lever 9 and the sleeve, and the clips 11 passing around the sleeve and around the block extend through the lever and are secured in position by means of suitable nuts 13. The rear end of the lever is provided with a suitable operating-handle and with a pivoted catch 13', adapted to engage a lug 14 upon the rear end of the pan and support this end of the pan. The main portion of the lever, it will be seen, extends almost centrally over the pan to a point near the center of the axle, and the two forks being then securely fastened to the sleeve 7 makes the lever rigid therewith and prevents any twisting thereof by reason of the strain brought thereon. The pole 8 is provided at its rear end with the plates 15, secured to opposite sides thereof and projecting beyond its rear end. A strap 16 has its forward end pivotally connected between the plates 15, and its rear end passes around the sleeve 7, between suitable collars 17, and forms a pivotal connection on said sleeve. I preferably construct this strap of a single strip of metal, as shown in Figs. 3 and 4, said strip being doubled upon itself and passing around the sleeve 7 and provided at its forward end with an eye for the pin or bolt connecting said strap with the plates 13. The two parts of the strip are suitably riveted or otherwise connected together. This strap forms a connection between the pole and the axle and allows the swinging of the axle without changing the position of the pole. A draft-bar 17' is secured to the pole near its rear end, and at its forward end is provided with a clip 18, adapted to receive the usual doubletree. A bail 19 is arranged to connect the forward end of the pan with the pole. The sides of the pan are provided with the slotted connecting-plates 20, each having its forward end pivotally connected to a hanger 21, that is secured upon the side of the pan. A narrow plate 22 is arranged beneath the rear end of the guide-plate 20, and the guide-plate is slotted at 23 and is provided with suitable bolts 24, by means of which said guide-plate is secured to the pan. This construction permits the guide-plate to be adjusted to a limited extent forward or back. The rear ends of the bail 19 are arranged in these guide-plates, a narrow space being provided between the guide-plates and the wall of the pan. The upturned ends of the bail extend behind said plates, and while free to slide the length of the slot in said plate the ends of said bail are prevented from coming out of said slots. With this construction the ends of the bail will slide in the slot from the position shown in Fig. 3 to that shown in Fig. 4. The forward portion of the bail extends beneath the pole 8, and a supplemental bail 25 is connected to the bail 19 and practically encircles the pole and is free to slide thereon. A rod 26 with a hook upon its end is secured upon the supplemental bail and is adapted to engage the pan when it is tipped up in position for transportation, as shown in Fig. 1. I provide means for locking the supplemental bail to the pole when it is in its forward position. This means is shown in detail in Figs. 9 and 10 of the drawings. As here shown, the pole is provided with the vertical standards 27, having pivotally supported therein a hook 28. The rear end of this hook is adapted to engage the supplemental bail 25, as shown in Fig. 10, thereby preventing said bail from sliding backward on the pole. For the purpose of locking the hook 28 in position I provide a short shaft 29, mounted in the standards 27 and carrying an eccentric 30. The ends of the shaft 29 are secured to the arms 31, which project forward from the standards 27 and have connected to their upper ends the operating-rod 32. When the eccentric is in the position indicated by dotted lines in Fig. 10, the hook 28 is locked in position and the bail 25 cannot move backward on the pole. When it is desired to release the bail, the operating-rod 32 is grasped and pulled backward, turning the shaft 29 and eccentric 30 and permitting the hook 28 to move so as to release the bail 25. The hook 28 is provided with a slot through which the pivot-pin passes, as indicated by dotted lines in Fig. 10, this slot being of sufficient size to permit the hook to slide forward and its rear end to raise so as to permit the bail 25 to pass under the end of the hook when the bail slides forward on the pole.

When it is desired to fill the scraper, the pan is lowered into the position shown in Fig. 3 and the scraper is drawn forward until the pan is filled with earth or material to be moved. During this operation the wheels may or may not rest upon the ground. As soon as the pan is filled the rear end of the lever 9 is depressed and the hook 13' is engaged with the lug upon the back end of the pan. This movement of the lever 9 raises the forward end of the pan. When the pan has reached the position shown in Fig. 4, it is desirable to raise it into the position shown in Fig. 5 and to lock it in this position in order that the scraper may be moved to the position where it is desired to dump the load. It is also desirable that the pan should be raised by means of the power of the team instead of being raised by hand. For this purpose I provide upon the hub of the wheel a suitable ratchet 35, Figs. 7 and 8, and I secure also upon the hub of the wheel a dog 36, that is adapted to engage said ratchet. A spring 37 is arranged in connection with this dog and is adapted to hold its outer end in position to engage one of the ratchet-teeth. A chain 38 has its forward end connected to the hanger 10 on the forward end of the pan, and its rear end has two branches, one of which is connected to the dog 36 and the other to a lug on the wheel-hub. A block 39 is secured to the axle inside of the offset portion, and this block projects far enough to serve as a fulcrum for the operating-lever 9 when the rear end of said lever is depressed, as shown in Fig. 4 of the drawings. A chain 40 is also connected to the pan or hanger 10 and has its forward end connected to the bail 19. A spring 41 is arranged upon the outside of the pan 6, near the top thereof, as shown in Fig. 5 of the drawings. When the pan is in the position shown in Fig. 3 of the drawings, the chain 38 will be loose and the dog 36 will be in position to engage the ratchet 35. This will cause the axle to rotate with the wheels, and thereby the offset portion of the axle will be turned from the position shown in Fig. 4 to the position shown in Fig. 5, raising the pan into the position shown in Fig. 5. In depressing the lever 9 from the position shown in Fig. 3 to that shown in Fig. 4 the forward portion of the lever will rest upon the block 39, (see Fig. 4,) which will serve as a fulcrum and cause the forward end of the pan to be lifted to the position shown in Fig. 4. When the pan has reached the position shown in Fig. 5, the part of the branch of the chain connected to the dog 36 will be drawn taut and will draw the dog 36 out of engagement with the ratchet, thereafter permitting the wheel to rotate upon the axle. At the same time the branch of the chain connected to the lug on the hub will also be drawn taut and the pan will be prevented from further forward movement. The rear end of the spring 41 will at the same time drop in front of the block 39 (see Fig. 7) and the pan will be prevented from rearward movement. By this means the axle and the pan will be rigidly locked in the position shown in Fig. 5 of the drawings, and this condition will continue and the scraper may be moved by the team connected to the pole an indefinite distance. When the load has been brought to the point where it is desired to dump it, the operating-rod 32 will be moved to release the hook 28 and the bail 25, and the forward end of the pan will now drop down to engage with the surface of the ground. A further movement of the pan will cause the pan to turn to the position shown in Fig. 1 of the drawings, in which position the pan will be engaged by the hook and will be locked in position for transporting empty to the position in which it is to be refilled. To permit the front end of the pan to pass freely over stumps or other obstructions on the return trip, it can be tipped up still higher to the position shown in Fig. 6. The rear end of the pan is preferably provided with suitable handles 45.

The details of the construction may obviously be varied in many particulars without departing from my invention.

I claim as my invention—

1. The combination, in a wheeled scraper, with the wheels, of an axle provided with cranks or offsets, a sleeve arranged upon the offset portion of the axle, an offset operating-lever mounted upon said sleeve, and a suitable pan supported upon said lever, substantially as described.

2. The combination, in a wheeled scraper, with the wheels, of an axle provided with cranks or offsets, a sleeve arranged upon the offset portion of the axle, an operating-lever extending for a portion of its length substantially parallel to said sleeve and secured thereto, and a suitable pan supported upon said lever.

3. The combination, in a wheeled scraper, of an axle provided with cranks or offsets, a sleeve arranged upon the offset portion of the axle, an operating-lever mounted upon said sleeve, suitable fulcrums secured upon said axle and within said offset portion, and a pan supported upon said lever.

4. The combination, in a wheeled scraper, with the wheels, of the axle having an offset portion, the pole, and a connecting-bar pivotally connected to said pole and to the offset portion of said axle.

5. The combination, in a wheeled scraper, with the wheels, of the axle having an offset portion, the pole, a connecting strap or bar between said pole and the offset portion of the axle pivotally connected to each, an operating-lever mounted upon the offset portion of the axle, and a pan supported upon said lever, substantially as described.

6. The combination, in a wheeled scraper, with the wheels, the offset axle, of a pan, an operating-lever mounted upon the offset portion of the axle and supporting said pan, a bail connected to said pan and extending over the pole, and a hook arranged to engage said bail, and means for locking said hook, substantially as described.

7. The combination, in a wheeled scraper, with the wheels, the offset axle and the pole, of the pan, means for supporting said pan upon said axle, a bail connected to said pan and passing over said pole and adapted to slide thereon, a hook for engaging said bail, and an eccentric-lock for securing said hook.

8. The combination, in a wheeled scraper, with the pole, of the pan provided with the bail arranged to pass over said pole, the hook 28 mounted in suitable supports upon said pole, the eccentric 30 arranged to engage said hook, and means for operating said eccentric, substantially as described.

9. The combination, in a wheeled scraper, with the wheels provided with ratchets upon their hubs, the offset axle, the pan supported upon said axle, the dog or latch arranged upon said axle and adapted to engage said ratchet and the branched chain connected with said pan and having the end of one branch connected to said dog and the end of the other branch connected to a lug on the axle, substantially as described.

In witness whereof I have hereunto set my hand this 19th day of August, 1902.

CHARLES H. SAWYER.

In presence of—
  A. C. PAUL,
  C. G. HANSON.